United States Patent Office 3,042,671
Patented July 3, 1962

3,042,671
BENZOPYRIDOCOLINES
Joseph G. Lombardino, Brooklyn, and William M. Mc-
Lamore, Kew Gardens, N.Y., and Gerald D. Laubach,
Niantic, Conn., assignors to Chas. Pfizer & Co., Inc.,
New York, N.Y., a corporation of Delaware
No Drawing. Filed Oct. 7, 1959, Ser. No. 844,878
11 Claims. (Cl. 260—243)

This invention relates to new and useful heterocyclic compounds as well as to novel methods and intermediates for their preparation. More particularly, the present invention is concerned with novel organic nitrogen compounds which possess a unique sulfur-containing heterocyclic ring system; it is also concerned with the non-toxic acid addition salts of those compounds of the aforementioned type which are organic nitrogen bases. There is also included within the scope of this invention various pharmaceutical compositions which have as their essential active ingredient at least one of the herein described compounds.

The compounds which are included within the purview of this invention are selected from the class of thiabenzopyridocolines which have the following general structural formula:

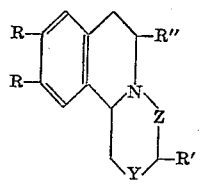

wherein each R is a member of the group consisting of hydroxy, lower alkoxy and alkyl and when both R groups are taken together they form a methylenedioxy group, R' is a member of the group consisting of hydrogen, lower alkenyl, alkyl, trifluoromethyl, hydroxyalkyl, acyloxyalkyl, lower alkoxyalkyl, aralkyl, aroylamino and aryl, each alkyl moiety having from one to five carbon atoms and said acyl moiety being derived from a hydrocarbon carboxylic acid having from two to eight carbon atoms, R" is a member of the group consisting of hydrogen and lower alkyl, Y is a member of the group consisting of sulfur, oxosulfur and dioxosulfur, and Z is a member of the group consisting of methylene and carbonyl; and the pharmaceutically acceptable acid addition and quaternary ammonium salts of those compounds wherein Z is methylene. The system of nomenclature employed throughout this specification is that based on the Patterson system of nomenclature as is illustrated by the foregoing structural formula for a 2-thia-1,2,3,4,6,7-hexahydro-11b-H - benzopyridocoline [e.g., see A. M. Patterson and L. T. Capell, The Ring Index, Reinhold Publishing Corporation, New York (1940)].

In accordance with the present invention, the aforementioned thiabenzopyridocoline derivatives have been found to possess interesting pharmaceutical properties which render them useful as synthetic medicinals. More particularly, these compounds have been shown to exhibit utility as muscle relaxants as well as tranquilizing or hypotensive agents. Of especial value in this connection are those thiabenzopyridocolines which have both a 9,10-dimethoxy grouping and a 3-substituent as previously defined on the ring nitrogen atom of the secondary amino group; typical 3-substituents include such groups as allyl, n-butyl, isoamyl, γ-hydroxypropyl, β-(3,4,5 - trimethoxybenzoyloxy) ethyl, p-chlorobenzyl and benzoylamino.

In accordance with the process for preparing the compounds of this invention, a 1-(6,7 - disubstituted - 1,2,3,4-tetrahydroisoquinolyl)methyl mercaptan alkali metal (M) salt is treated with an appropriately substituted α-haloaliphatic hydrocarbon carboxylic acid ester or a corresponding α-halolactone as is illustrated below by the following equation for the ester reaction wherein X represents a halogen having an atomic weight greater than 19, R''' is a lower alkyl group, and R, R' and R" are all as previously defined:

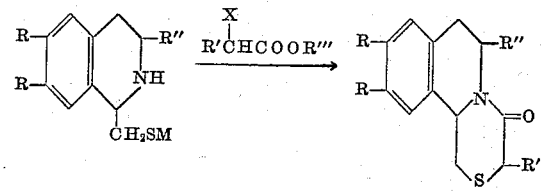

Subsequent reduction of the resulting 2-thia-3-substituted-4-oxo-9,10-disubstituted-1,2,3,4,6,7 - hexahydro - 11b - H-benzopyridocoline with lithium aluminum hydride affords the corresponding 4-desoxy compounds. Treatment of either of these thiabenzopyridocolines types with hydrogen or benzoyl peroxide yields the corresponding sulfoxide compounds which, in turn, can be converted to the corresponding sulfones or further oxidation with either of these same reagents.

In accordance with a more specific embodiment of the process of this invention, the foregoing illustrated reaction is most desirably conducted in an inert polar organic solvent at a temperature that is in the range of from about 20° C. to about 120° C. for a period of about fifteen minutes to about five hours. Preferred reaction-inert solvents in this connection include carbon disulfide, tetrahydrofuran, dioxane, lower saturated alkanols such as methanol, ethanol, isopropanol, n-butanol, and the like; lower dialkylethers such as dimethyl ether, diethyl ether, di-isopropyl ether, di-n-butyl ether, and the like; and halogenated lower hydrocarbons such as methylene chloride, ethylene dichloride, chloroform, trichloroethylene, s-tetrachloroethane, and the like. Although any α-haloaliphatic hydrocarbon carboxylic acid ester can be used as the reagent of choice in this condensation step provided that the halogen atom is one having an atomic weight that is at least above 19 as previously indicated, it is preferable to employ the α-bromo ester in order to achieve optimum results; typical examples of such esters include ethyl α-bromo-n-caproate, α - bromobutyrolactone, α-bromovalerolactone, and the like.

The starting materials employed in the process of this invention are all easily prepared in accordance with standard organic procedures previously described in the chemical literature. For instance, the aforementioned appropriately substituted 1-(6,7-disubstituted-1,2,3,4-tetrahydroisoquinolyl)methyl mercaptan alkali metal salts are conveniently synthesized from their corresponding 1-(S-benzylmercapto)methylisoquinoline analogs via treatment with an alkali metal in liquid ammonia. The latter intermediates are readily obtainable by condensing a β-[3,4-di(substituted)phenyl]alkylamine with a lower alkyl ester of S-benzylmercaptoacetic acid followed by a cyclization of the amide so produced with phosphorus oxychloride and subsequent reduction of the resulting cyclized product with sodium borohydride, whereby the desired but heretofore unavailable 1-(S-benzylmercaptomethyl)-6,7-disubstituted - 1,2,3,4, - tetrahydroisoquinoline is afforded in good yields.

The acids which are used to prepare the pharmaceutically acceptable acid addition salts of the aforementioned thiabenzopyridocoline bases, i.e., the 4-desoxy compounds, are those which form non-toxic acid addition salts containing pharmaceutically acceptable anions, such as the hydrochloride, hydrobromide, hydriodide, nitrate, sulfate or bisulfate, phosphate or acid phosphate, acetate, lactate, citrate or acid citrate, tartrate or bitartrate, oxalate, succinate, maleate, gluconate and saccharate salts. Suitable quaternary ammonium salts of the thiabenzopyridocoline derivatives of this invention include those which are obtained by reacting thiabenzopyridocoline bases of the foregoing type with a pharmaceutically acceptable organic halide, such as methyl iodide, ethyl chloride, allyl chloride, benzyl bromide, and the like, or with an equally acceptable sulfuric acid lower alkyl ester or an arylsulfonic acid lower alkyl ester, such as dimethyl sulfate, diethyl sulfate, methyl benzenesulfonate, ethyl p-toluenesulfonate, and the like.

As previously indicated, the compounds of the present invention are readily adapted to therapeutic use as hypotensive agents in addition to being useful as sedatives in view of their ability to reduce serotonin and norepinephrine blood levels in the brain. Furthermore, the toxicity of these 2-thiabenzopyridocolines has been found to be quite low when they are administered to mice in amounts that are generally considered to be sufficient to achieve the desired effects as hereinafter indicated, while no harmful pharmacological side effects have been observed to occur as a result of their administration. The aforementioned biological activity of the herein described compounds is well illustrated by a series of tests previously described in the literature and hence, well-known to those skilled in the art. For instance, the percent decrease in serotonin and norepinephrine levels in the rabbit was determined in accordance with the procedure described by P. Shore et al. in the Journal of Pharmacology and Experimental Therapeutics, vol. 122, p. 295 (1958), as well as by S. Udenfriend et al. in Science, vol. 122, p. 972 (1955).

In accordance with a method of treatment of the present invention, the herein described thiabenzopyridocoline derivatives can be administered to an agitated subject via the oral or parenteral routes. In general, these compounds are most desirably administered in doses ranging from about 50 mg. to about 500 mg. per day, although variations will necessarily occur depending upon the weight of the subject being treated and the particular route of administration chosen. However, a dosage level that is in the range of from about 0.7 mg. to about 7.0 mg. per kg. of body weight per day is most desirably employed in order to achieve effective results. Nevertheless, it is to be appreciated that still other variations may also occur in this respect, depending upon the species of animal being treated and its individual response to said medicament, as well as on the particular type of formulation chosen and the time period and interval at which such administration is carried out. In some instances, dosages below the lower limit of the aforesaid range may be more than adequate, while in other cases still larger dosages may be employed without causing any harmful or deleterious side effects provided that such higher dosage levels are first divided into several smaller doses that are to be administered throughout the day.

In connection with the use of the thiabenzopyridocoline compounds of this invention for the treatment of agitated subjects, it is to be noted that they may be administered either alone or in combination with a pharmaceutically acceptable carrier by either of the routes previously indicated, and that such administration can be carried out in both single and multiple dosages. More particularly, the novel compounds of this invention can be administered in a wide variety of dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be sweetened and/or flavored by means of various agents of the type commonly employed for such a purpose. In general, the therapeutically-active compounds of this invention are present in such dosage forms at concentration levels ranging from about 0.020% to about 90% by weight of the total composition, i.e., in amounts which are sufficient to provide the desired unit dosage previously indicated.

For purposes of oral administration, tablets containing various excipients such as sodium sitrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-shelled gelatin capsules; preferred materials in this connection also include lactose or milk sugar as well as high molecular weight polyethylene glycols. When aqueous suspensions and/or elixirs are desired for oral administration, the essential active ingredient may be combined with various sweetening or flavoring agents, coloring matter or dyes and, if so desired, emulsifying and/or suspending agents, together with such diluents as water, ethanol, propylene glycol, glycerin and various combinations thereof.

For purposes of parenteral administration, solutions of the 2-thiabenzopyridocoline bases in sesame or peanut oil or in aqueous-propylene glycol may be employed, as well as sterile aqueous solutions of the corresponding water-soluble salts previously enumerated. Such aqueous solutions should be suitably buffered if necessary and the liquid diluent rendered isotonic with sufficient glucose or saline. These particular solutions are especially suitable for intravenous, intramuscular and subcutaneous injection purposes. In this connection, the sterile aqueous media employed are readily obtained by standard techniques well-known to those in the art. For instance, when distilled water is ordinarily used as the liquid diluent the final preparation can be passed through a suitable bacterial filter, such as a sintered glass filter or a diatomaceous earth or unglazed porcelain filter. Preferred filters of this type include the Berkefeld, the Chamberland and the asbestos disc-metal Seitz filter, wherein the fluid is sucked through the filter candle into a sterile container with the aid of a suction pump. Needless to say, aseptic conditions must necessarily be maintained throughout such operations which are connected with the preparation of these injectable solutions.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example 1*

In a 1-liter three-necked, round-bottom flask (which had previously been preflushed with nitrogen) equipped with a magnetic stirring apparatus and nitrogen bubbler and having a reflux condenser, dropping funnel and thermometer attached thereto, there was placed a solution consisting of 77.5 g. (0.58 mole) of 70% thioglycolic acid. After cooling the flask and contents to 20° C., stirring was commenced and 125 ml. of 20% aqueous sodium hydroxide was slowly added dropwise, keeping the temperature of the reaction mixture below 25° C. throughout this step (the addition required approximately 20 minutes).

Upon completion of this step, 100 g. (0.585 mole) of benzyl bromide was slowly added dropwise to the resulting aqueous solution while maintaining the temperature of the latter at approximately 15° C. After the addition was complete, the reaction mixture was refluxed for one hour under a nitrogen atmosphere and then cooled to room temperature. The cooled reaction solution so obtained was then extracted with one-250 ml. portion of diethyl ether, and the resulting aqueous layer was cooled to 0° C. and made acidic with 114 ml. of 6N hydrochloride acid. The acidified aqueous solution was then successively extracted with three-500 ml. portions of diethyl ether, and the three resulting extracts were subsequently combined and dried over anhydrous sodium sulfate. After removal of the drying agent by means of filtration and evaporation of the resulting filtrate to dryness under reduced pressure, there was obtained a 68.4 g. (65%) yield of S-benzylmercaptoacetic acid, M.P. 57–61° C.

The corresponding methyl ester of this acid was prepared by treating an ethereal solution of the parent compound with excess diazomethane to afford an almost quantitative yield of methyl S-benzylmercaptoacetate. This product proved to be identical with that obtained by refluxing 130.5 g. (0.718 mole) of the same acid with 202 ml. of absolute methyl alcohol (3.5 moles) in 800 ml. of chloroform containing 1 g. of p-toluenesulfonic acid. After refluxing for about 16 hours in the presence of anhydrous magnesium sulfate, the reaction mixture was cooled to room temperature and the chloroform layer which separated was successively extracted with one-100 ml. portion of 1N sodium hydroxide and two-500 ml. portions of water. The so treated chloroform layer was then dried over anhydrous magnesium sulfate, filtered and subsequently concentrated under reduced pressure to afford 140 g. of a residual liquid which was fractionally distilled in vacuo to yield 96.6 g. (69%) of methyl S-benzylmercaptoacetate, B.P. 107–110° C./0.10–0.35 mm. Hg; $n_D^{22°}$ 1.4061.

*Example II*

In a one-necked, round-bottomed flask equipped with magnetic stirring apparatus and having a reflux condenser and nitrogen inlet tube attached thereto, there were placed 78.1 g. (0.392 mole) of methyl S-benzylmercaptoacetate and 77.43 g. (0.470 mole) of homoveratrylamine. Stirring was commenced and the mixture was heated at 140° C. for 24 hours under a nitrogen atmosphere. Upon completion of this step, the methanol byproduct was removed by means of evaporation under a high vacuum and the residual oil was dissolved in isopropanol, treated with activated charcoal and filtered. The resulting filtrate was then evaporated under reduced pressure to about one-third of its original volume and allowed to cool slowly to room temperature. After further cooling at 5° C. for about 16 hours, there was obtained a 121.5 g. (90%) yield of S-benzyl-N-homoveratrylthioglycolamide in the form of a yellow crystalline material melting at 62–65° C.

*Example III*

When 90.6 g. (0.470 mole) of β-(3,4-diethoxyphenyl) ethylamine is used in lieu of the homoveratrylamine of the previous example in accordance with this very same procedure, the corresponding product obtained is S-benyl-N-[β - (3,4-diethoxyphenyl)ethyl]thioglycolamide. In the same manner and employing the appropriate molar amounts of reagent in each case, β-(3,4-di-n-butoxyphenyl)ethylamine is converted to S-benzyl-N-[β-(3,4-di-n-butoxyphenyl)ethyl]thioglycolamide; β-(3,4-di-isoamyl-oxyphenyl)ethylamine is converted to S-benzyl-N-[β-(3,4-di - isoamyloxyphenyl)ethyl]thioglycolamide; β - (3,4-methylenedioxyphenyl)ethylamine is converted to S-benzyl - N - [β - (3,4 - methylenedioxyphenyl)ethyl] thioglycolamide; and β-(3,4-dihydroxyphenyl)ethylamine is converted to S-benzyl-N-[β-(3,4-dihydroxyphenyl) ethyl]thioglycolamide.

In like manner, β(3,4-xylyl)ethylamine is converted to S-benzyl-N-[β-(3,4-xylyl)ethyl]thioglycolamide; β-(3,4-diethylphenyl)ethylamine is converted to S-benzyl-N-[β-(3,4-diethylphenyl)ethyl]thioglycolamide; β-(3,4-di-n-butylphenyl)ethylamine is converted to S-benzyl-N-[β-(3,4-di-n-butylphenyl)ethyl]thioglycolamide; and β-(3,4-di-isoamylphenyl)ethylamine is converted to S-benzyl-N-[β-(3,4-di-isoamylphenyl)ethyl]thioglycolamide.

*Example IV*

In a 5-liter three-necked, round-bottomed flask equipped with a magnetic stirring apparatus and having a reflux condenser, drying tube and dropping funnel attached thereto, there was placed a solution consisting of 121.5 g. (0.352 mole) of S-benzyl-N-homoveratrylthioglycolamide in 2000 ml. of dry toluene. Stirring was commenced and the mixture was refluxed for about 15–20 minutes in order to effect complete solution. To this solution there was then added dropwise from the dropping funnel 453 g. (3.08 mole) of phosphorus oxychloride during the course of about a seven minute period. After completion of the addition step, the resulting mixture was stirred and refluxed for five hours and then stirred for an additional hour without any external heating until room temperature was attained. At this point, the entire reaction mixture was decanted into 3000 ml. of hexane which resulted in the immediate precipitation of a yellow oil. The latter was then separated and dissolved in 400 ml. of hot water, and the resulting aqueous solution was subsequently treated with activated charcoal and filtered. Upon allowing the aqueous filtrate to cool slowly in an ice bath, there was obtained a 53.8 g. yield of 1 - (S - benzylmercaptomethyl)-6,7--dimethoxy-3-4-dihydroisoquinoline, M.P. 164–168° C.

*Example V*

When 131.4 g. (0.352 mole) of S-benzyl-N-[β-(3,4-diethoxyphenyl)ethyl]-thioglycolamide is used in lieu of the S-benzyl-N-homoveratrylthioglycolamide of the previous example in accordance with this very same reaction procedure, the corresponding product obtained is 1-(S-benzylmercaptomethyl) - 6,7 - diethoxy - 3,4 - dihydroisoquinoline. In the same manner and employing appropriate molar amounts of reagents in each case, S-benzyl-N-[β-(3,4--di-n-butoxyphenyl)ethyl]thioglycolamide is converted to 1-(S-benbylmercapto)-6,7-di-(n-butoxy)-3,4-dihydroisoquinoline; S-benzyl-N-[β - (3,4 - di-isoamyloxyphenyl)ethyl]thioglycolamide is converted to 1-(S-benzylmercapto)-6,7-di-isoamyloxy-3,4 - dihydroisoquinoline; S-benzyl-N-[β - (3-methylenedioxyphenyl)ethyl]thioglycolamide is converted to 1-(S-benzylmercapto)-6,7-methylenedioxy-3,4-dihydroisoquinoline; and S-benzyl-N-[α-(n-butyl)-β - (3,4 - dihydroxyphenyl)ethyl]thioglycolamide is converted to 1-(S-benzylmercapto)-3-(n-butyl)-6,7-dihydroxy-3,4-dihydroisoquinoline.

In like manner, S-benzyl-N-[α-ethyl-β-(3,4-xylyl)-ethyl]thioglycolamide is converted to 1-(S-benzylmercapto)-3-ethyl-6,7-dimethyl-3,4 - dihydroisoquinoline; S-benzyl-N-[α-methyl - β - (3,4 - diethylphenyl)ethyl]thioglycolamide is converted to 1-(S-benzylmercapto)-3-methyl-6,7-diethyl-3,4-dihydroisoquinoline; S-benzyl - N- [β-(3,4-di-n-butylphenyl)ethyl]thioglycolamide is converted to 1-(S-benzylmercapto)-6,7-di(n-butoxy)-3,4-di-hydroisoquinoline; and S-benzyl-N-[β-(3,4-di-isoamyl-phenyl)-ethyl]thioglycolamide is converted to 1-(S-benzylmercapto)-6,7-di-isoamyl-3,4-dihydroisoquinoline.

*Example VI*

5.3 grams (0.148 mole) of 1-(S-benzylmercapto)-6,7-dimethoxy-3,4-dihydroisoquinoline were partitioned between 200 ml. of 10% aqueous sodium hydroxide and four-250 ml. portions of chloroform. The separated chloroform layers were then washed with 200 ml. of water and dried over anhydrous sodium sulfate, while the basic aqueous layer was subsequently discarded. After removal of the drying agent by means of filtration and concentration of the resulting filtrate under reduced pressure, there was obtained a residual brown oil which was subsequently dissolved in 250 ml. of absolute ethanol. The alcoholic solution so obtained was then placed in a dropping funnel equipped with a pressure equalizer, and slowly dropped therefrom into a three-necked, round-bottomed flask equipped with magnetic stirring apparatus and having a reflux condenser and drying tube attached thereto; the flask contained 16.8 g. (0.444 mole) of sodium borohydride suspended in 300 ml. of absolute ethanol. Constant agitation was maintained throughout the dropwise addition, while the flask and its contents were cooled to 0–5° C. by means of an ice bath. After the addition was complete (this required approximately one hour), the reaction mixture was refluxed for a further hour and then stirred for an additional 15 minutes while it was allowed to cool slowly to room temperature. At this point, 200 ml. of water was added to the cooled (0° C.) reaction mixture and the resulting suspension was evaporated under reduced pressure to about one-third of its original volume. After the addition of 500 ml. of water to the aqueous concentrate, the resulting solution was successively extracted with six-350 ml. portions of diethyl ether and the combined ether layers were subsequently dried over anhydrous sodium sulfate. Upon removal of the drying agent by means of filtration and subsequent evaporation of the solvent under reduced pressure, there was obtained a 48.17 g. (99%) yield of 1-(S-benzylmercapto)-6,7-dimethoxy - 1,2,3,4 - tetrahydroisoquinoline as an orange-colored viscous oil which solidified completely on subsequent cooling and scratching to afford a crystalline material melting at 59–61° C.

*Example VII*

When 57.94 g. (0.148 mole) of 1-(S-benzylmercapto)-6,7-diethoxy-3,4-dihydroisoquinoline is used as the starting material in lieu of the foregoing dimethoxy compound of the previous example in accordance with this very same reaction procedure, the corresponding product obtained is 1-(S-benzylmercapto)-6,7-diethoxy-1,2,3,4-tetrahydroisoquinoline. In the same manner and employing appropriate molar amounts of reagents in each case, 1-(S-benzylmercapto)-6,7-di(n-butyl) - 3,4-dihydroisoquinoline is converted to 1-(S-benzylmercapto)-6,7-di(n-butyl)-1,2,3,4-tetrahydroisoquinoline; 1-(S-benzylmercapto)-6,7-di-isoamyloxy-3,4-dihydroisoquinoline is converted to 1-(S-benzylmercapto) - 6,7 - di-isoamyloxy-1,2,3,4-tetrahydroisoquinoline; 1-(S-benzylmercapto)-6,7-methylenedioxy-3,4-dihydroisoquinoline is converted to 1-(S-benzylmercapto) - 6,7 - methylenedioxy - 1,2,3,4-tetrahydroisoquinoline; and 1-(S-benzylmercapto)-3-(n-butyl)-6,7-dihydroxy-3,4-dihydroisoquinoline is converted to 1-(S-benzylmercapto) - 3 - (n - butyl) - 6,7-dihydroxy-1,2,3,4-tetrahydroisoquinoline.

In like manner, 1-(S-benzylmercapto)-3-ethyl-6,7-dimethyl-3,4-dihydroisoquinoline is converted to 1-(S-benzylmercapto)-3-ethyl-6,7 - dimethyl-1,2,3,4-tetrahydroisoquinoline; 1-(S-benzylmercapto)-3-methyl-6,7-diethyl-3,4-dihydroisoquinoline is converted to 1-(S-benzylmercapto)-3 - methyl - 6,7-diethyl-1,2,3,4-tetrahydroisoquinoline; 1-(S - benzylmercapto) - 6,7 - di-(n-butyl)-3,4-dihydroisoquinoline is converted to 1-(S-benzylmercapto)-6,7-di(n-butyl)-1,2,3,4-tetrahydroisoquinoline; and 1-(S-benzylmercapto)-6,7-di-isoamyl-3,4-dihydroisoquinoline is converted to 1-(S-benzylmercapto)-6,7-di-isoamyl-1,2,3,4-tetrahydroisoquinoline.

*Example VIII*

To a 500 ml. three-necked flask containing approximately 250 ml. of liquid ammonia under constant agitation there was added 5.9 g. (0.018 mole) of 1-(S-benzylmercapto)-6,7-dimethoxy - 1,2,3,4-tetrahydroisoquinoline, while a slow stream of nitrogen was simultaneously introduced into the resulting mixture. After stirring for an additional fifteen minutes, 0.83 g. (0.036 g.-atom) of metallic sodium was added in small portions during the course of a twenty minute period. Upon completion of this step, the reaction mixture was stirred for an additional ten minutes at room temperature and then subjected to the heating effect of a warm-water bath in order to evaporate completely any excess ammonia that might still be present. In this manner, there was obtained a light tan residual solid which proved to be the sodium salt of 1-mercapto-6,7-dimethoxy-1,2,3,4-tetrahydroisoquinoline.

To this intermediate there was then added dropwise during the course of a ten minute period a solution consisting of 4.24 g. (0.019 mole) of ethyl α-bromoisocaproate in 100 ml. of absolute ethanol; this solution had previously been flushed with nitrogen prior to the addition step. After stirring for 30 minutes at room temperature, the resulting reaction mixture was refluxed for two hours under a nitrogen atmosphere. At the end of the reflux period, the solution was evaporated under reduced pressure via a water bath to afford a light yellow-orange residual oil. The latter substance was dissolved in 300 ml. of chloroform, and the resulting solution was successively washed with two equal portions of water. The washed chloroform layer was then separated from the aqueous layer and subsequently treated with one-200 ml. portion of 5% aqueous sodium bicarbonate, one-200 ml. portion of 1 N hydrochloric acid and two-200 ml. portions of water and then dried over anhydrous sodium sulfate. After removal of the drying agent by means of filtration and subsequent concentration of the resulting filtrate under reduced pressure, there was obtained a 5.5 g. (87%) yield of 2-thia-3-isobutyl-4-oxo-9,10-dimethoxy-1,2,3,4,6,7-hexahydro-11b-H-benzopyridocoline.

*Example IX*

When 6.4 g. (0.018 mole) of 1-(S-benzylmercapto)-6,7-diethoxy-1,2,3,4-tetrahydroisoquinoline is used as the starting material in lieu of the analogous dimethoxy compound of the previous example in accordance with this very same series of reaction procedures, the corresponding intermediate and product obtained is 1-sodiomercapto-6,7-diethoxy-1,2,3,4-tetrahydroisoquinoline and 2-thia-3-isobutyl-4-oxo - 9,10 - diethoxy - 1,2,3,4,6,7 - hexahydro-11b-H-benzopyridocoline, respectively. In the same manner and employing appropriate molar amounts of reactants in each case, 1-(S-benzylmercapto)-6,7-di(n-butoxy)-1,2,3,4-tetrahydroisoquinoline is converted via 1-sodiomercapto-6,7-di(n-butoxy) - 1,2,3,4 - tetrahydroisoquinoline to 2-thia-3-isobutyl-4-oxo-9,10-di(n-butoxy)-1,2,3,4,6,7-hexahydro - 11b - H-benzopyridocoline; 1-(S-benzylmercapto)-6,7-di-isoamyloxy - 1,2,3,4 - tetrahydroisoquinoline is converted via the corresponding 1-sodiomercapto salt to 2-thia-3-isobutyl-4-oxo-9,10-di-isoamyloxy-1,2,3,4,6,7-hexahydro - 11b - H - benzopyridocoline; 1-(S-benzylmercapto) - 6,7-methylenedioxy-1,2,3,4-tetrahydroisoquinoline is converted via the corresponding 1-sodiomercapto salt to 2-thia-3-isobutyl-4-oxo-9,10-methylenedioxy-1,2,3,4,6,7-hexahydro - 11b - H - benzopyridocoline; and 1-(S-benzylmercapto)-3-(n-butyl) - 6,7 - dihydroxy-1,2,3,4-tetrahydroisoquinoline is converted via the corresponding 1-sodiomercapto salt to 2-thia-3-isobutyl-6-(n-butyl)-9,10-dihydroxy-1,2,3,4,6,7 - hexahydro-11b-H-benzopyridocoline.

In like manner, 1-(S-benzylmercapto)-3-ethyl-6,7-dimethyl-1,2,3,4-tetrahydroisoquinoline is converted via 1-sodiomercapto-3-ethyl-6,7-dimethyl - 1,2,3,4 - tetrahydroisoquinoline to 2-thia - 3 - isobutyl-4-oxo-6-ethyl-9,10-dimethyl-1,2,3,4,6,7-hexahydro-11b-H - benzopyridocoline; 1-(S-benzylmercapto)-3-methyl - 6,7 - diethyl - 1,2,3,4-tetrahydroisoquinoline is converted via the corresponding 1-sodiomercapto salt to 2-thia-3-isobutyl-4-oxo-6-methyl-9,10-diethyl-1,2,3,4,6,7-hexahydro - 11b - H - benzopyridocoline; 1-(S-benzylmercapto) - 6,7 - di(n-butyl)-1,2,3,4-tetrahydroisoquinoline is converted via the corresponding 1-sodiomercapto salt to 2-thia-3-isobutyl-4-oxo-9,10-di(n-butyl)-1,2,3,4,6,7-hexahydro - 11b - H - benzopyridocoline; and 1-(S-benzylmercapto)-6,7-di-isoamyl-1,2,3,4-tetrahydroisoquinoline is converted via the corresponding 1-sodiomercapto salt to 2-thia-3-isobutyl-4-oxo-9,10-diisoamyl-1,2,3,4,6,7-hexahydro-11b - H-benzopyridocoline.

*Example X*

The procedure described in Example VIII is followed except that other α-bromo esters are employed in lieu of the isocaproate. Thus, when 5.9 g. (0.0018 mole) of 1-(S-benzylmercapto)-6,7-dimethoxy - 1,2,3,4 - tetrahydroisoquinoline is converted to its 1-sodiomercapto salt as previously described and the latter intermediate is subsequently reacted with 4.24 g. (0.019 mole) of ethyl α-bromo-n-caproate in accordance with this very same procedure, the corresponding product obtained is 2-thia-3-(n-butyl)-4-oxo-9,10-dimethoxy - 1,2,3,4,6,7 - hexahydro-11b-H-benzopyridocoline. In the same manner and employing appropriate molar amounts of reactants in each case, 1-sodiomercapto-6,7 - dimethoxy-1,2,3,4-tetrahydroisoquinoline and ethyl α-bromo-n-propionate react to afford 2-thia-3-methyl - 4 - oxo-9,10-dimethoxy-1,2,3,4,6,7-hexahydro-11b - H - benzopyridocoline; 1-sodiomercapto-6,7-dimethoxy-1,2,3,4-tetrahydroisoquinoline and ethyl α-bromo-n-butyrate react to afford 2-thia-3-ethyl-4-oxo-9,10 - dimethoxy - 1,2,3,4,6,7 - hexahydro-11b-H-benzopyridocoline; 1 - sodiomercapto - 6,7 - dimethoxy-1,2,3,4-tetrahydroisoquinoline and ethyl α-bromo-n-valerate react to afford 2-thia-3-(n-propyl)-9,10-dimethoxy-1,2,3,4,6,7-hexahydro-11b-H-benzopridocoline; and 1-sodiomercapto-6,7-dimethoxy - 1,2,3,4-tetrahydroisoquinoline and ethyl α-bromo-n-heptanoate react to afford 2-thia-3-(n-amyl)-9,10-dimethoxy - 1,2,3,4,6,7 - hexahydro - 11b-H-benzopyridocoline.

In like manner, ethyl α-bromo-3-butenoate-1 affords 2-thia-3-vinyl-4-oxo-9,10 - dimethoxy - 1,2,3,4,6,7 - hexahydro - 11b - H-benzopyridocoline;

ethyl α-bromo-4-pentenoate-1 affords 2-thia-3-allyl-4-oxo-9,10 - dimethoxy - 1,2,3,4,6,7 - hexahydro - 11b - H-benzopyridocoline;

ethyl α-bromo-δ-methyl-4-pentenoate-1 affords 2-thia-3-methylallyl - 4 - oxo - 9,10 - dimethoxy - 1,2,3,4,6,7-hexahydro-11b-H-benzopyridocoline;

ethyl α-bromobutyrolactone affords 2-thia-3-(β-hydroxyethyl) - 4 - oxo - 9,10 - dimethoxy - 1,2,3,4,6,7 - hexahydro-11b-H-benzopyridocoline;

ethyl α-bromovalerolactone affords 2-thia-3-(γ-hydroxypropyl) - 4 - oxo - 9,10 - dimethoxy - 1,2,3,4,6,7 - hexahydro-11b-H-benzopyridocoline;

ethyl α-bromo-γ-methoxy-n-butyrate affords 2-thia-3-(β-methoxyethyl) - 4 - oxo - 9,10 - dimethoxy - 1,2,3,4,6,7-hexahydro-11b-H-benzopyridocoline;

ethyl α-bromo-γ-isopropoxy-n-valerate affords 2-thia-3-(γ-isopropoxypropyl) - 4 - oxo - 9,10 - dimethoxy - 1,2,3,4,6,7-hexahydro-11b-H-benzopyridocoline;

ethyl α-bromo-β,β,β-trifluoro-n-propionate affords 2-thia-3 - trifluoromethyl - 4 - oxo - 9,10 - dimethoxy - 1,2,3,4,6,7-hexahydro-11b-H-benzopyridocoline;

ethyl α-bromo-β-phenyl-n-propionate affords 2-thia-3-benzyl - 4 - oxo - 9,10 - dimethoxy - 1,2,3,4,6,7 - hexahydro-11b-H-benzopyridocoline;

ethyl α-bromo-β-(p-chlorophenyl)-n-propionate affords 2-thia - 3 - (p - chlorobenzyl) - 4 - oxo - 9,10 - dimethoxy-1,2,3,4,6,7-hexahydro-11b-H-benzopyridocoline;

ethyl α-bromo-γ-phenyl-n-butyrate affords 2-thia-3-(β-phenylethyl) - 4 - oxo - 9,10 - dimethoxy - 1,2,3,4,6,7-hexahydro-11b-H-benzopyridocoline;

ethyl α-bromo-β-(2-thienyl)-n-propionate affords 2-thia-3 - (2 - thenyl) - 4 - oxo - 9,10 - dimethoxy - 1,2,3,4,6,7-hexahydro-11b-H-benzopyridocoline;

ethyl α-bromo-β-(2-furyl)-n-propionate affords 2-thia-3-(2 - furfuryl) - 4 - oxo - 9,10 - dimethoxy - 1,2,3,4,6,7-hexahydro-11b-H-benzopyridocoline;

ethyl α-bromophenylacetate affords 2-thia-3-phenyl-4-oxo-9,10 - dimethoxy - 1,2,3,4,6,7 - hexahydro - 11b - H-benzopyridocoline;

ethyl α-bromo(p-chlorophenyl)acetate affords 2-thia-3-(p-chlorophenyl) - 4 - oxo - 9,10 - dimethoxy - 1,2,3,4,6,7-hexahydro-11b-H-benzopyridocoline;

ethyl α-bromo(p-tolyl)acetate affords 2-thia-3-(p-tolyl)-4-oxo - 9,10 - dimethoxy - 1,2,3,4,6,7 - hexahydro - 11b-H-benzopyridocoline;

ethyl α-bromo(p-methoxyphenyl)acetate affords 2-thia-3-(p - methoxyphenyl) - 4 - oxo - 9,10 - dimethoxy - 1,2,3,4,6,7-hexahydro-11b-H-benzopyridocoline;

ethyl α-bromo-(2-thienyl)acetate affords 2-thia-3-(2-thienyl) - 4 - oxo - 9,10 - dimethoxy - 1,2,3,4,6,7 - hexahydro-11b-H-benzopyridocoline;

ethyl α-bromo-(2-furyl)acetate affords 2-thia-3-(2-furyl)-4 - oxo- 9,10 - dimethoxy - 1,2,3,4,6,7 - hexahydro - 11b-H-benzopyridocoline;

ethyl α-bromo-α-benzoylaminoacetate affords 2-thia-3-benzoylamino - 4 - oxo - 9,10 - dimethoxy - 1,2,3,4,6,7-hexahydro-11b-H-benzopyridocoline;

ethyl α-bromo-α-(p-chlorobenzoyl)aminoacetate affords 2 - thia - 3 - (p - chlorobenzoyl)amino - 4 - oxo - 9,10-dimethoxy - 1,2,3,4,6,7 - hexahydro - 11b - H - benzopyridocoline;

ethyl α-bromo-α-(2-thenoyl)aminoacetate affords 2-thia-3 - (2 - thenoyl)amino - 4 - oxo - 9,10 - dimethoxy - 1,2,3,4,6,7-hexahydro-11b-H-benzopyridocoline; and ethyl α-bromo-α-(2-furoyl)aminoacetate affords 2-thia-3-(2 - furoyl)amino - 4 - oxo - 9,10 - dimethoxy - 1,2,3,4,6,7-hexahydro-11b-H-benzopyridocoline.

*Example XI*

In a 250 ml. three-necked, round-bottomed flask equipped with a magnetic stirring apparatus, dropping funnel and reflux condenser having a drying tube attached thereto, there were placed 0.95 g. (0.025 mole) of lithium aluminum hydride and 75 ml. of freshly distilled tetrahydrofuran; the flask had previously been flushed with dry nitrogen prior to the addition of the aforesaid materials. Stirring was commenced and the suspension was refluxed for one-half hour. At the end of this period, the external heat source was removed and a solution of 4.0 g. (0.0119 mole) of 2-thia-3-isobutyl-4-oxo-9,10-dimethoxy-1,2,3,4,6,7-hexahydro-11b-H-benzopyridocoline in 75 ml. of distilled tetrahydrofuran was slowly added to the mixture dropwise during the course of about 15 minutes. Upon completion of this step, the resulting solution was refluxed for approximately 16 hours. After cooling to room temperature, the reaction mixture was carefully treated with 10 ml. of ethanol and then with 10 ml. of water which were both slowly added in small portions. The aqueous solution was then evaporated to dryness under reduced pressure, and the residual solid material so obtained was partitioned between 700 ml. of water and three-200 ml. portions of chloroform. The resulting chloroform layers were then combined and dried over anhydrous sodium sulfate, while the aqueous layer was subsequently discarded. After removal of the drying agent by means of filtration and concentration of the resulting filtrate under reduced pressure, there was obtained a residual dark-orange oil (2.59 g.) which was subsequently dissolved in a minimum amount of hot methanol and filtered. The resulting filtrate was then treated with excess methanolic HCl, and the reaction mixture so obtained was evaporated to dryness under reduced pressure to afford a residual brown oil. Treatment of the latter with 10 ml. of ethanol gave an alcoholic solution to which approximately 50 ml. of diethyl ether was added, followed by slow cooling. In this manner, fluffy white needles soon crystallized from solution to afford a 0.816 g. (23%) yield of 2-thia-3-isobutyl - 9,10 - dimethoxy - 1,2,3,4,6,7 - hexahydro - 11b-H-benzopyridocoline hydrochloride, M.P. 208–212° C.

*Example XII*

The procedure described in Example XI is followed except that 1.59 g. (0.00543 mole) of 2-thia-3-methyl-4-oxo - 9,10 - dimethoxy - 1,2,3,4,6,7 - hexahydro - 11b - H-benzopyridocoline is reacted with 0.43 g. (0.013 mole) of lithium aluminum hydride in 50 ml. of tetrahydrofuran to afford 0.937 g. (55%) of 2-thia-3-methyl-9,10-dimethoxy-1,2,3,4,6,7-hexahydro-11b-H-benzopyridocoline, M.P. 210–211.5° C. In the same manner and employing appropriate molar amounts of reactants in each case, 2-thia-3-ethyl-4-oxo-9,10-dimethoxy-1,2,3,4,6,7-hexahydro-11b-H-benzopyridocoline is converted to 2-thia-3-ethyl-9,10-dimethoxy-1,2,3,4,6,7-hexahydro-11b-H-benzopyridocoline;

2-thia-3-(n-propyl)-4-oxo-9,10-dimethoxy-1,2,3,4,6,7-hexahydro-11b-H-benzopyridocoline is converted to 2-thia-3-(n-propyl)-9,10-dimethoxy-1,2,3,4,6,7-hexahydro-11b-H-benzopyridocoline;

2-thia-3-(n-butyl)-4-oxo-9,10-dimethoxy-1,2,3,4,6,7-hexahydro-11b-H-benzopyridocoline is converted to 2-thia-3-(n-butyl)-9,10-dimethoxy-1,2,3,4,6,7-hexahydro-11b-H-benzopyridocoline;

2-thia-3-isoamyl-4-oxo-9,10-dimethoxy-1,2,3,4,6,7-hexahydro-11b-H-benzopyridocoline is converted to 2-thia-3-isoamyl-9,10-dimethoxy-1,2,3,4,6,7-hexahydro-11b-H-benzopyridocoline;

2-thia-3-(β-hydroxyethyl)-4-oxo-9,10-dimethoxy-1,2,3,4,6,7-hexahydro-11b-H-benzopyridocoline is converted to 2-thia-3-(β-hydroxyethyl)-9,10-dimethoxy-1,2,3,4,6,7-hexahydro-11b-H-benzopyridocoline; and 2-thia-3-(γ-hydroxypropyl)-4-oxo-9,10-dimethoxy-1,2,3,4,6,7-hexahydro-11b-H-benzopyridocoline is converted to 2-thia-3-(γ-hydroxypropyl)-9,10-dimethoxy-1,2,3,4,6,7-hexahydro-11b-H-benzopyridocoline.

In like manner, all the other 2-thia-3-substituted-4-oxo-9,10-disubstituted-1,2,3,4,6,7-hexahydro-11b-H-benzopyridocolines prepared in Examples IX and X are converted to the corresponding 4-desoxy compounds in accordance with this very same reaction procedure.

*Example XIII*

To a well-stirred, chilled (0° C.) chloroform solution containing (0.030 mole) of 2-thia-3-isobutyl-4-oxo-9,10-dimethoxy-1,2,3,4,6,7-hexahydro-11b-H-benzopyridocoline, there was added 4.2 g. (0.030 mole) of perbenzoic acid dissolved in 50 ml. of chloroform. After stirring the reaction mixture at 0° C. for one hour and then at room temperature for an additional hour, the solvent was removed by means of evaporation under reduced pressure and the residual material extracted with 10% aqueous sodium hydroxide solution in order to remove the benzoic acid. The so treated material was then taken up in chloroform, filtered and the resulting filtrate subsequently dried over anhydrous sodium sulfate. Removal of the chloroform from the dried solution in the usual manner afforded the desired 2-thiaoxo-3-isobutyl-4-oxo-9,10-dimethoxy-1,2,3,4,6,7-hexahydro-11b-H-benzopyridocoline.

In the same manner, 2-thia-3-(n-butyl)-4-oxo-9,10-dimethoxy-1,2,3,4,6,7-hexahydro-11b-H-benzopyridocoline is converted to 2-thiaoxo-3-(n-butyl)-4-oxo-9,10-dimethoxy-1,2,3,4,6,7-hexahydro-11b-H-benzopyridocoline;

2-thia-3-(γ-hydroxypropyl)-4-oxo-9,10-dimethoxy-1,2,3,4,6,7-hexahydro-11b-H-benzopyridocoline is converted to 2-thiaoxo-3-(γ-hydroxypropyl)-4-oxo-9,10-dimethoxy-1,2,3,4,6,7-hexahydro-11b-H-benzopyridocoline;

2-thia-3-(p-chlorobenzyl)-4-oxo-9,10-dimethoxy-1,2,3,4,6,7-hexahydro-11b-H-benzopyridocoline is converted to 2-thiaoxo-3-(p-chlorobenzyl)-4-oxo-9,10-dimethoxy-1,2,3,4,6,7-hexahydro-11b-H-benzopyridocoline;

2-thia-3-benzoylamino-4-oxo-9,10-dimethoxy-1,2,3,4,6,7-hexahydro-11b-H-benzopyridocoline is converted to 2-thiaoxo-3-benzoylamino-4-oxo-9,10-dimethoxy-1,2,3,4,6,7-hexahydro-11b-H-benzopyridocoline;

and 2-thia-3-isobutyl-9,10-dimethoxy-1,2,3,4,6,7-hexahydro-11b-H-benzopyridocoline is converted to 2-thiaoxo-3-isobutyl-9,10-dimethoxy-1,2,3,4,6,7-hexahydro-11b-H-benzopyridocoline.

In like manner, all the other 2-thia compounds previously reported in the foregoing examples are each individually converted to their corresponding sulfoxides in accordance with this very same procedure.

*Example XIV*

The procedure described in Example XIII is followed except that the amount of perbenzoic acid used is exactly twice the amount used in the previous example; in each case, the corresponding dioxosulfur heterocycle is the product obtained. Thus, 2-thia-3-isobutyl-4-oxo-9,10-dimethoxy-1,2,3,4,6,7-hexahydro-11b-H-benzopyridocoline is converted to 2-thiadioxo-3-isobutyl-4-oxo-9,10-dimethoxy-1,2,3,4,6,7-hexahydro-11b-H-benzopyridocoline;

2-thia-3-(n-butyl)-4-oxo-9,10-dimethoxy-1,2,3,4,6,7-hexahydro-11b-H-benzopyridocoline is converted to 2-thiadioxo-3-(n-butyl)-4-oxo-9,10-dimethoxy-1,2,3,4,6,7-hexahydro-11b-H-benzopyridocoline;

2-thia-3-(γ-hydroxypropyl)-4-oxo-9,10-dimethoxy-1,2,3,4,6,7-hexahydro-11b-H-benzopyridocoline is converted to 2-thiadioxo-3-(γ-hydroxypropyl)-4-oxo-9,10-dimethoxy-1,2,3,4,6,7-hexahydro-11b-H-benzopyridocoline;

2-thia-3-(p-chlorobenzyl)-4-oxo-9,10-dimethoxy-1,2,3,4,6,7-hexahydro-11b-H-benzopyridocoline is converted to 2-thiadioxo-3-(p-chlorobenzyl)-4-oxo-9,10-dimethoxy-1,2,3,4,6,7-hexahydro-11b-H-benzopyridocoline;

2-thia-3-benzoylamino-4-oxo-9,10-dimethoxy-1,2,3,4,6,7-hexahydro-11b-H-benzopyridocoline is converted to 2-thiadioxo-3-benzoylamino-4-oxo-9,10-dimethoxy-1,2,3,4,6,7-hexahydro-11b-H-benzopyridocoline; and 2-thia-3-isobutyl-9,10-dimethoxy-1,2,3,4,6,7-hexahydro-11b-H-benzopyridocoline is converted to 2-thiadioxo-3-isobutyl-9,10-dimethoxy-1,2,3,4,6,7-hexahydro-11b-H-benzopyridocoline.

In like manner, all the other 2-thia compounds previously reported in the foregoing examples are each individually converted to their corresponding sulfones in accordance with this very same procedure.

*Example XV*

2-thia-3-[β-(3,4,5-trimethoxybenzoyloxy)ethyl]-4-oxo-9,10-dimethoxy-1,2,3,4,6,7-hexahydro-11b-H-benzopyridocoline is prepared by treating the corresponding non-acylated thiabenzopyridocoline in chloroform with 3,4,5-trimethoxybenzoyl chloride at room temperature for about 15 minutes. In the same manner, treatment of each of the other 3-hydroxyalkylthiabenzopyridocolines described in the previous examples with 3,4,5-trimethoxybenzoyl chloride affords the corresponding 3,4,5-trimethoxybenzoyl esters. Moreover, other hydrocarbon carboxylic acid esters of these hydroxyalkyl derivatives have also been prepared by this very same procedure by merely employing the appropriate acyl chloride in each case. Such other esters which have been specifically obtained in this manner include the acetate, propionate, valerate, caproate, benzoate, p-chlorobenzoate, phenylacetate, 2-thenoate and 2-furoate. For instance, 2-thia-3-(β-hydroxyethyl)-9,10-dimethoxy-1,2,3,4,6,7-hexahydro-11b-H-benzopyridocoline and acetyl chloride react to afford the corresponding 3-acetate, while 2-thiaoxo-3-(γ-hydroxypropyl)-9,10-dimethoxy-1,2,3,4,6,7-hexahydro-11b-H-benzopyridocoline and benzoyl chloride react to afford the corresponding 3-benzoate.

*Example XVI*

The non-toxic acid addition salts of each of the 2-thiabenzopyridocoline bases reported in Examples XI–XV are prepared by either one of two general methods. In the case of the hydrohalide salts, such as the hydrochloride, hydrobromide and hydriodide, this is accomplished by first dissolving the 2-thiabenzopyridocoline base in absolute ether followed by introduction of the appropriate hydrogen halide gas into the solution until saturation is effected, whereupon the desired salt precipitates from the solution; the crystalline product so obtained is then recrystallized from acetone to yield the pure hydrohalide salt. In the case of the corresponding nitrate, sulfate or bisulfate, phosphate or acid phosphate, acetate, lactate, citrate or acid citrate, tartrate or bitartrate, oxalate, succinate, maleate, gluconate and saccharate salts, the respective acid and the appropriate 4-desoxy thiabenzopyridocoline base are both separately dissolved in ethanol and the two solutions are then mixed, followed by the addition of diethyl ether to the resulting reaction mixture in order to effect precipitation of the desired acid addition salt from solution.

*Example XVII*

2-thia-3-(n-butyl)-4-oxo-9,10 - dimethoxy - 1,2,3,4,6,7-hexahydro-11b-H-benzopyridocoline is reacted with an equimolar amount of methyl chloride in an isopropanol solvent medium by allowing said reaction solution to stand at room temperature for 18 hours, and then raising the temperature to 90–100° C. for 30 minutes. The crystals which separate can be recrystallized from isopropanol-methyl ethyl ketone to afford the methyl chloride quaternary ammonium salt of 2-thia-3-(n-butyl)-9,10-dimethoxy-1,2,3,4,6,7-hexahydro-11b-H-benzopyridocoline.

This same thiabenzopyridocoline base also reacts with methyl iodide in anhydrous diethyl ether to offer the corresponding quaternary ammonium iodide. Reaction of the above base with ethyl bromide in methyl ethyl ketone at 50–60° C. for 18 hours and then at 100° C. for 2 hours yields the corresponding ethyl quaternary ammonium bromide.

In the same manner, each of the other 4-desoxy triabenzopyridocoline compounds described in Examples XI–XV are reacted with each of the aforementioned methyl halides, as well as with allyl chloride and benzyl bromide to afford the corresponding quaternary ammonium halides. Similarly, reaction of each of these 2-thiabenzopyridocoline bases with such reagents as dimethyl sulfate, diethyl sulfate, methyl benzenesulfonate and ethyl p-toluenesulfonate yields the corresponding quaternary ammonium sulfates in each case.

*Example XVIII*

A dry solid pharmaceutical composition was prepared by blending the following materials in the proportions by weight specified:

2 - Thia-3-(n-butyl)-9,10-dimethoxy-1,2,3,4,6,7-hexahydro-11b-H-benzopyridocoline _____ 10
Sodium citrate _____ 50
Alginic acid _____ 20
Polyvinylpyrrolidone _____ 15
Magnesium stearate _____ 5

After the dried composition was thoroughly blended, tablets were punched from the resulting mixture, each tablet being of such size that it contained 100 mg. of the active ingredient.

*Example XIX*

A dry solid pharmaceutical composition was prepared by combining the following materials in the proportions by weight specified:

2-Thia-3-isobutyl - 9,10 - dimethoxy-1,2,3,4,6,7-hexahydro-11b-H-benzopyridocoline _____ 10
Polyethylene glycol (aver. molec. wght., 6000) _____ 30
Lactose _____ 40
Calcium carbonate _____ 20

The dried solid mixture so prepared was thoroughly agitated so as to obtain a powdered product that was completely uniform. Soft elastic and hard shelled gelatin capsules containing this pharmaceutical composition were then prepared, employing a sufficient quantity of material so as to furnish 250 mg. of the active ingredient in each capsule.

*Example XX*

An aqueous propylene glycol solution containing 2-thia-3-(γ-hydroxypropyl) - 9,10 - dimethoxy-1,2,3,4,6,7-hexahydro-11b-H-benzopyridocoline hydrochloride was prepared by dissolving the latter compound in propylene glycol-water (1:3 by weight) with the air of gentle heating. The amount of compound employed was such that the resulting solution contained 5 mg. of the active ingredient per ml. After cooling to room temperature, it was sterilized by means of filtration through a Seitz filter. The sterile aqueous-propylene glycol solution so obtained was suitable for intramuscular administration to animals.

What is claimed is:

1. A compound selected from the class of thiabenzopyridocolines having the structural formula:

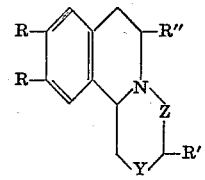

wherein each R is a member of the group consisting of hydroxy, lower alkoxy and alkyl having 1 to 5 carbon atoms and when both R groups are taken together they form a methylenedioxy group, R' is a member of the group consisting of hydrogen, lower alkenyl, alkyl, trifluoromethyl, hydroxyalkyl, acyloxyalkyl, lower alkoxyalkyl, benzyl, chlorobenzyl, phenylethyl, thenyl, furfuryl benzoylamino, p-chlorobenzoylamino, thenoylamino, furoylamino phenyl, p-chlorophenyl, p-tolyl, p-methoxyphenyl, thienyl and furyl, each alkyl moiety having from one to five carbon atoms and said acyl moiety being derived from a hydrocarbon carboxylic acid having from two to eight carbon atoms, R" is a member of the group consisting of hydrogen and lower alkyl, Y represents a member of the group consisting of sulfur, oxosulfur and dioxosulfur, and Z is a member of the group consisting of methylene and carbonyl; and the pharmaceutically acceptable acid addition salts and the pharmaceutically acceptable quaternary ammonium salts of those compounds wherein Z is methylene.

2. 2-thia-4-oxo - 9,10 - di(lower alkoxy) - 1,2,3,4,6,7-hexahydro-11b-H-benzopyridocoline.

3. 2-thia - 3 - (n-butyl)-4-oxo-9,10-dimethoxy-1,2,3,4,6,7-hexahydro-11b-H-benzopyridocoline.

4. 2-thia-3-isobutyl-4-oxo-9,10-dimethoxy - 1,2,3,4,6,7-hexahydro-11b-H-benzopyridocoline.

5. 2 - thia-9,10-di(lower alkoxy) - 1,2,3,4,6,7-hexahydro-11b-H-benzopyridocoline.

6. 2-thia-3-isobutyl - 9,10 - dimethoxy-1,2,3,4,6,7-hexahydro-11b-H-benzopyridocoline.

7. 2-thiaoxo - 4 - oxo-9,10-di(lower alkoxy)-1,2,3,4,6,7-hexahydro-11b-H-benzopyridocoline.

8. 2-thiaoxo-9,10-di(lower alkoxy) - 1,2,3,4,6,7-hexahydro-11b-H-benzopyridocoline.

9. 2-thiadioxo-4-oxo-9,10-di(lower alkoxy) - 1,2,3,4,6,7-hexahydro-11b-H-benzopyridocoline.

10. 2-thiadioxo - 9,10 - di-(lower alkoxy)-1,2,3,4,6,7-hexahydro-11b-H-benzopyridocoline.

11. The process which comprises reacting a 1-(1,2,3,4-tetrahydroisoquinolyl)methyl mercaptan alkali metal salt having the structural formula:

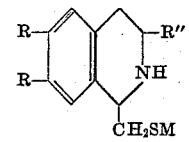

wherein each R is a member of the group consisting of hydroxy, lower alkoxy and alkyl having from one to five carbon atoms and when both R groups are taken together they form a methylenedioxy group, and R" is a member of the group consisting of hydrogen and lower alkyl with a compound selected from the group consisting of an α-haloaliphatic hydrocarbon carboxylic acid ester corresponding to the formula:

and an α-halolactone corresponding to the formula:

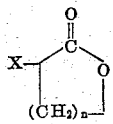

wherein X represents a halogen having an atomic weight greater than 19, R' is a member of the group consisting of hydrogen, lower alkenyl, alkyl, trifluoromethyl, hydroxyalkyl, acyloxyalkyl, lower alkoxyalkyl, benzyl, chlorobenzyl, phenylethyl, thenyl, furfuryl, benzylamino, p-benzylamino, thenoylamino, furoylamino, phenyl, p-chlorophenyl, p-tolyl, p-methoxyphenyl, thienyl and furyl, each alkyl moiety having from one to five carbon atoms and said acyl moiety being derived from a hydrocarbon carboxylic acid having from two to eight carbon atoms, R''' is a lower alkyl group and $n$ is an integer in the range of 1-2, inclusive, said reaction being conducted in a reaction-inert polar organic solvent at a temperature that is in the range of from about 20° C. to about 120° C. for a period of about 0.25 to about 5.0 hours.

No references cited.